ed Apr. 24, 1956

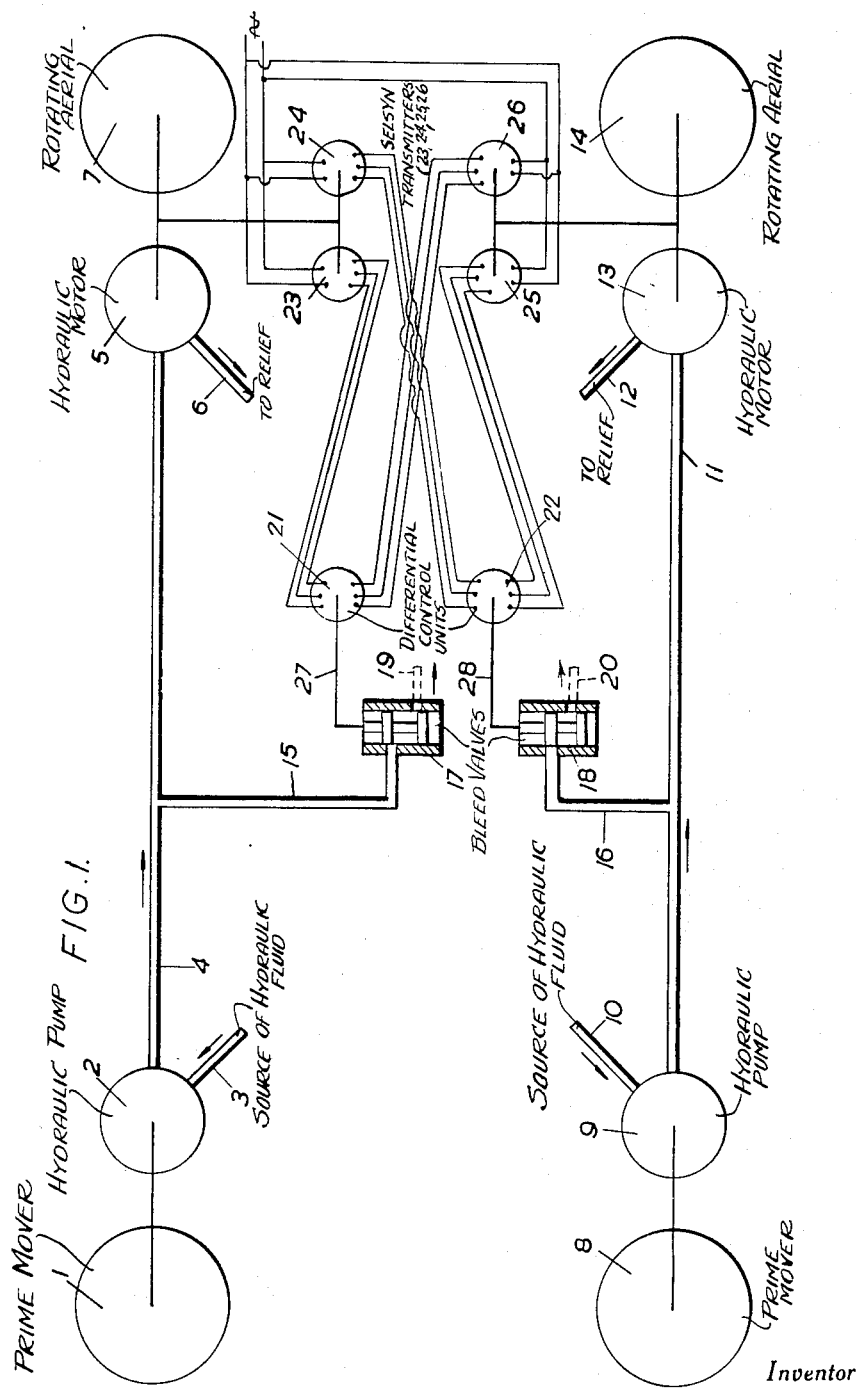

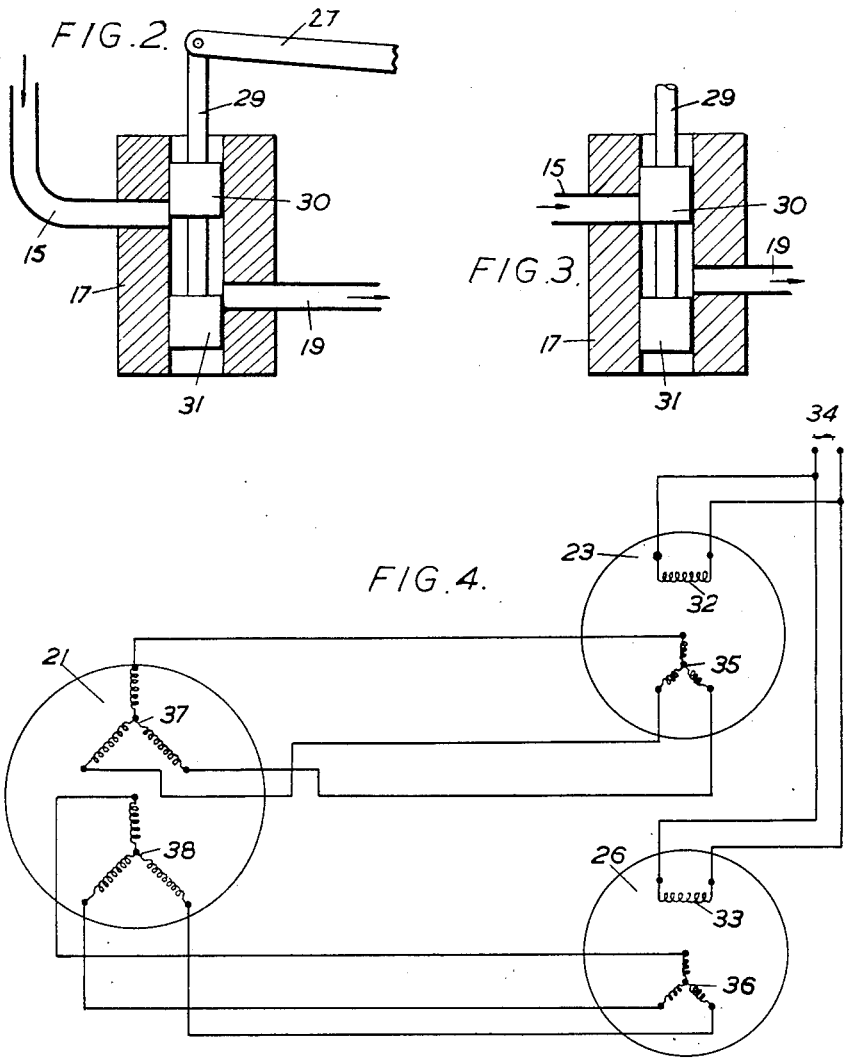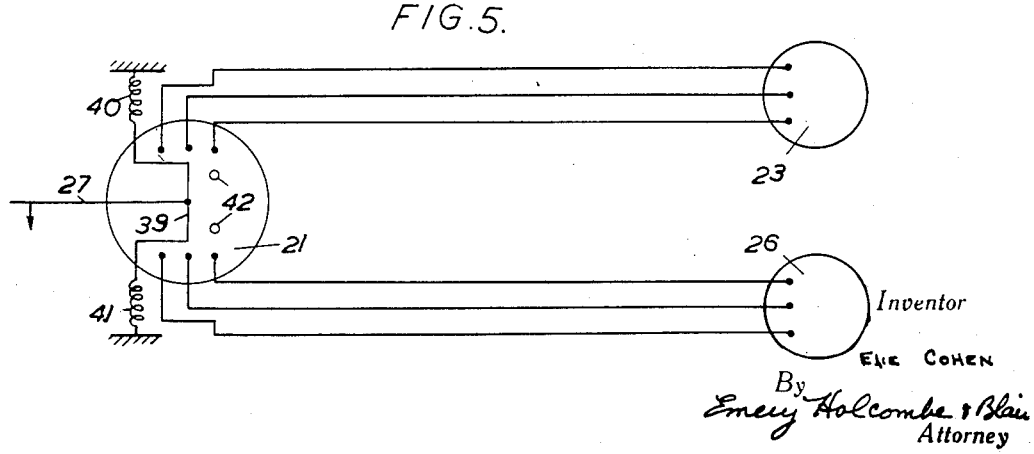

2,742,763
APPARATUS FOR PROVIDING SYNCHRONIZATION BETWEEN HYDRAULICALLY OPERATED MEMBERS

Elie Cohen, Paris, France, assignor to The Keelavite Company Limited, Coventry, England, a company of Great Britain Application December 3, 1951, Serial No. 259,674

Claims priority, application France December 11, 1950

2 Claims. (Cl. 60—97)

This invention relates to the synchronization of the driven members in two hydraulically operated systems, each system being of the kind comprising a source of hydraulic pressure, a hydraulic motor and a driven member coupled to the motor.

In the following specification and claims the words "synchronous" and "synchronized" are to be understood to refer to any predetermined positional or speed relationship between the two bodies in question.

An object of the invention is to provide an improved apparatus for automatically ensuring synchronization between the driven members in two such hydraulic systems, even if they be relatively widely spaced apart.

Apparatus for providing automatic synchronization between two hydraulically driven members, according to the present invention, comprises a valve in the hydraulic circuit of each driven member for controlling the supply of hydraulic fluid thereto, and differential control mechanism responsive to departures from a predetermined speed or positional relationship between the two driven members and operatively connected to each valve so as to vary the supply of hydraulic fluid in a manner tending to maintain the required relationship.

Preferably each valve has a normal effective setting which can only be changed in one direction, and any divergence of the driven members from the required relationship causes the effective setting of only the appropriate one of the two valves to be changed.

It is preferred that each valve should be connected to relief and the arrangement should be such that any departure from the desired relationship causes opening of the relief valve in the passage leading to the member requiring to be retarded to restore the relationship.

According to another preferred feature of the invention each valve controls a passage through which fluid can escape from or be admitted under pressure to the hydraulic circuit of its associated driven member and each valve is normally closed and any divergence of the driven members from the desired relationship causes opening of the appropriate one of the valves while the other remains closed.

The two driven members may have a rotary motion, and the differential control mechanism may be responsive to the divergence from a predetermined angular relationship between the two driven members.

Thus according to another preferred feature of the invention the differential control mechanism comprises electric generators of the type known as Selsyn transmitters coupled to the driven members, and an operating element in the form of a Selsyn differential control unit, responsive to the relationship between the signals received from the Selsyn transmitters and connected to each valve.

The invention may be reduced to practice in various ways but one form of apparatus according to the invention will now be described by way of example with reference to the accompanying drawings in which, Figure 1 is a block diagram of the main essential elements of a system for providing synchronization between two hydraulically driven rotating bodies.

Figure 2 is a sectional view of one of the valves used in the system of Figure 1, Figure 3 is a similar view to Figure 2 with the valve in a different operative position, Figure 4 is a diagrammatic circuit layout of part of the control system of Figure 1, and Figure 5 is a further diagramatic circuit layout showing the method by which the part of the control system shown in Figure 4 operates one of the valves.

The system whose main elements are shown diagrammatically in Figure 1 comprises for example two separate hydraulic installations for driving two rotating aerials, which may in some cases be widely spaced apart, and includes means for obtaining synchronization between the two aerials.

A prime mover 1 which may be an electric motor for example, is mechanically coupled to a hydraulic pump 2 which receives hydraulic fluid from a suitable source through a connection 3 and delivers fluid under pressure to a pipe line 4. A hydraulic motor 5 which is arranged to receive pressure fluid from the line 4, and to pass the fluid to relief through a line 6, is coupled to a rotating body 7, which in the present instance is a rotating aerial. A second installation in all respects identical with the installation so far described comprises a prime mover 8, a hydraulic pump 9, a hydraulic circuit including a supply line 10, a delivery line 11, and a relief line 12, a hydraulic motor 13, and a rotating aerial 14.

Each hydraulic circuit is provided with a branch duct 15, and 16, between the respective pump and motor, leading to valves 17 and 18, which are connected to relief through the lines 19 and 20 respectively. In the present case the valves 17, 18, act as bleed valves to reduce the supply of pressure fluid in the respective hydraulic circuits to which they are connected.

Each valve 17 and 18 is controlled by a differential control system comprising an operating element 21, 22, associated respectively with two of the rotary responsive elements 23, 24, 25, and 26. The two rotatary responsive elements 23, 24 are coupled to the rotating aerial 7, while the two elements 25, 26, are coupled to the rotating aerial 14, and each operating element 21, 22, is connected to one element of each of the these pairs (the connection being shown in broken lines in Figure 1), and is arranged to act upon the respective valve 17, 18 in accordance with any differential component of rotary displacement or velocity existing between the two rotary responsive elements with which it is associated. The control of the respective valve 17 and 18 by its operating element 21, or 22, may be direct or through an amplifier, for example of the electrical, mechanical, or hydraulic type, but for convenience in Figure 1 the control is simply indicated diagrammatically by the lines 27, 28.

The valves 17, and 18, may be of the linear or rotary displacement type, and may include a hydraulic servo-system for amplifying the control thrust or torque, but one simple type of directly operated piston valve is shown rather diagrammatically by way of example in Figures 2 and 3. The valve 17 is provided with a cylindrical bore in which slides a valve element 29 having two balancing pistons 30 and 31, and connected to the operating control link 27. In Figure 2 the valve element 29 is shown in its open position with the pistons 30, 31, each uncovering approximately half the cross-sectional areas of the ports connected to the hydraulic lines 15 and 19. In this position of the valve hydraulic fluid will be allowed to flow from the line 15 to relief via the line 19.

The valve is shown in its closed position in Figure 3, with the piston 30 completely closing the valve port connected to the fluid line 15. It will be seen that in this position the piston 30 is only just closing the port, and that any upward movement of the valve element 29 will cause the piston to uncover the port, whereas downward movement of the valve element from this closed position will merely cause the valve to remain closed.

The differential control system for the valves may be of any convenient type, the essential requirement which it must fulfill being that its action on the valves 17 and 18 should be a function of the angular displacement or velocity between the two rotary bodies 7 and 14, which are to be synchronized. For example the control system may be of one of the following types:

(1) A classic mechanical system in cases where the two rotating bodies to be synchronized are relatively close to one another, (2) An electrical system such as will be described later, (3) An "on-off relay system," that is to say a system which does not provide a variable control but operates positively in response to any predetermined degree of divergence between correct synchronization of the two rotating bodies, (4) A radio-electrical system serving as a relay to provide synchronization at very great distances, or (5) A combination of two or more of the above systems.

In the electrical system shown in Figures 4 and 5, each rotating body 7 and 14 is mechanically coupled, either directly or indirectly, to an electrical generating apparatus of the type known as a Selsyn transmitter. This type of apparatus is well known, and is similar to those used for remote indication purposes. The construction and operation of apparatus of this kind has been described by R. Aubry in "Memorial de l'Artillerie Francaise," vol. XXI, No. 3, 1947, under the title "Transmissions synchrones par moteurs asynchrones."

The two rotary responsive elements 23, and 26, each comprises a Selsyn transmitter and includes a fixed stator winding 32, 33 connected to the same source of A. C. current 34, and a rotor winding 35, 36, of the 3-phase type driven respectively by the rotating bodies 7 and 14. The rotor winding 35 is connected electrically as shown to a 3-phase stator winding 37 in the operating element 21, which is in the form of a Selsyn differential control unit, and the rotor winding 36 is similarly connected to a 3-phase rotor winding 38 in the operating element. The rotor 39 of the operating element 21, upon which the winding 38 is mounted, is held in its normal neutral position as shown in Figure 5 by means of two opposed springs 40, 41 and it will be seen that the rotor 39 will be subjected to a torque in one direction or the other according to the direction and the degree of angular displacement between the two rotor windings 35, 36, and therefore of the displacement between the rotating bodies 7 and 14. The rotor 39 is connected to the link 27 which operates the control valve 17, and stops 42 are provided to limit the movement of the rotor.

The construction of the two rotary responsive elements 24, 25 and the differential operating element 22 is in all respects identical with the construction of the elements 21, 23, 26, described above, with the exception that the arrangement is such that the operating element 22 is caused to move the link 28 in the opposite direction to the movement of the link 27 for any given direction of displacement between the rotating bodies 7 and 14.

The neutral position of the two operating elements 21, 22, that is to say the position of the rotors when the bodies 7 and 14 are in correct angular synchronization corresponds to the closed position of the valves 17 and 18.

The apparatus operates in the following way:

Assuming that the rotating bodies 7 and 14 are in the form of rotating aerials, it will be seen that the hydraulic motors 5 and 13 will be subject to considerable variations of resistance due to the effect of wind on the large surface areas of the aerials. The requirements of the apparatus are that it should drive the two aerials in angular synchronization however great the distance between the aerials may be.

By a preliminary regulation the two aerials are made to rotate at approximately the same mean velocity, with the two valves 17, 18, closed and the full discharge from each pump 2, and 9, is then absorbed by the respective motors 5 and 13.

The differential control system is then brought into operation, and if for any reason the aerials are not in correct angular synchronization, which may be due to an initial displacement or to a drop in speed of one or other aerial consequent on a variation of resistance or a drop in voltage applied to one of the electric motors 1 or 8, for example, the rotors of the two operating elements 21, 22, will have a torque applied to them.

Assuming that the aerial 14 is lagging behind the aerial 7, the operating element 21 will act to open the valve 17, thereby allowing pressure fluid to escape through the line 19, while the valve 18, which is operated in the reverse direction, will, as explained above, merely remain closed. Thus the supply of pressure fluid to the motor 5 is decreased, and the aerial 7 temporarily slows down, until such time as it comes into correct angular synchronization with the aerial 14 when the torque on the rotors of the operating elements 21, 22, is removed and both valves 17 and 18 are closed again.

If on the other hand the aerial 7 lags behind the aerial 14, the operation of the valves is reversed, and the motor 13 is caused to slow down.

It will be observed that with this system the leading aerial is retarded into synchronization with the lagging aerial. It will also be noted that the equilibrium maintained is substantially stable, for with a constant load on the aerials, the time constant of the differential control system will normally be considerably less than the time constant of any variations in the speed of the prime movers 1 and 8, while any sudden variations of the load at the motors 5 and 13 will affect the pressure in the pipe line 4 in a way to assist the operation of the valves 17 and 18.

The precision of the apparatus is therefore almost entirely dependent upon the sensitivity of the differential control system.

It will be understood that the invention is not restricted to the particular form of apparatus described, nor to the specific functions mentioned. For example by using apparatus of the same general type as described, but of somewhat lower sensitivity, it is possible to obtain speed synchronization as opposed to angular synchronization between the rotating bodies. In this case the torque exerted by the rotors of operating elements 21, 22, resulting from an angular displacement between the bodies is not sufficient to effect any appreciable control of the valves 17 and 18, and the differential control system only operates effectively when an appreciable difference in speed occurs between the two rotating bodies.

It is also possible to provide a type of synchronization with a multiplication factor, one of the rotation bodies having a speed which bears a predetermined relationship to the speed of the other body. For example the rotary responsive elements 23, 24, 25, 26, might be connected to the motors 5 and 13, respectively, while the rotating bodies 7 and 14 are driven by separate drives from the two motors at the required gear ratio.

In the apparatus described, where the outlet of both valves 17 and 18 is connected to relief, the operation of the system is always such as to retard the leading or more rapidly rotating body into synchronization with the lagging body. It will be understood however that apparatus according to the invention may also be arranged so that the lagging body is speeded up into synchronization with the leading body. For this purpose an auxiliary supply of hydraulic fluid under pressure may be required, and the valves 17, 18 may be connected to this auxiliary supply instead of to relief.

Moreover although the apparatus has been described with reference to the synchronization of two rotating aerials, it will also be understood that the invention is equally applicable to the synchronization of other bodies or apparatus, for example rolling mill trains or paper making cylinders. Furthermore the invention may also be applied to the synchronization of systems having linear motion, or a combination of linear and rotary motion.

What I claim as my invention and desire to secure by Letters Patent is:

1. Apparatus for providing automatic synchronization between two widely spaced hydraulically driven rotary members, comprising two hydraulic installations, each installation including a hydraulic pump, a hydraulic motor coupled to and driving one of said driven members and a hydraulic circuit through which hydraulic fluid is supplied under pressure from said pump to said motor, a bypass connected to each hydraulic circuit through which hydraulic fluid may pass in order to vary the supply of such fluid to said motors, a valve in each bypass, and differential mechanism controlling the setting of said valves, said mechanism comprising a pair of selsyn transmitters actuated by each of said rotary driven members and a pair of selsyn differential control units each electrically connected to one selsyn transmitter from each pair and one control unit being operatively connected to each of said valves so as to vary the setting of said valve in said bypass in response to differences in the currents furnished by said pairs of transmitters as a result of changes in the angular relationship between the driven members which actuate them, and thereby vary the supply of hydraulic fluid furnished to the motors driving the driven members in a manner tending to maintain the required angular relationship between said driven members.

2. Apparatus as claimed in claim 1 in which each valve is normally closed, and the arrangement is such that any divergence of the rotary members from the desired angular relationship causes opening of the appropriate one of the valves, while the other valve remains closed.

References Cited in the file of this patent

UNITED STATES PATENTS

| Number | Name | Date |
|---|---|---|
| 1,999,834 | Ernst | Apr. 30, 1935 |
| 2,003,558 | Schmidt | June 4, 1935 |
| 2,148,543 | Dinzl | Feb. 28, 1939 |
| 2,260,469 | Martin | Oct. 28, 1941 |
| 2,330,070 | Martin et al. | Sept. 21, 1943 |
| 2,360,598 | Tyler | Oct. 17, 1944 |
| 2,380,973 | Kopp | Aug. 7, 1945 |
| 2,467,576 | Zimmerman | Apr. 19, 1949 |
| 2,558,071 | Castle et al. | June 26, 1951 |
| 2,583,307 | Schneider | Jan. 22, 1952 |
| 2,634,387 | Mercier | Apr. 7, 1953 |